United States Patent
Suzuki et al.

(10) Patent No.: US 7,823,075 B2
(45) Date of Patent: Oct. 26, 2010

(54) GUI APPLICATION DEVELOPMENT SUPPORT DEVICE, GUI DISPLAY DEVICE, AND METHOD, AND COMPUTER PROGRAM

(75) Inventors: Hironori Suzuki, Kanagawa (JP); Kenichi Moriwaki, Tokyo (JP); Naoya Okamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 571 days.

(21) Appl. No.: 10/494,391

(22) PCT Filed: Aug. 29, 2003

(86) PCT No.: PCT/JP03/11036

§ 371 (c)(1), (2), (4) Date: Nov. 1, 2004

(87) PCT Pub. No.: WO2004/023294

PCT Pub. Date: Mar. 18, 2004

(65) Prior Publication Data

US 2005/0050156 A1    Mar. 3, 2005

(30) Foreign Application Priority Data

Sep. 6, 2002    (JP) .............................. 2002-261354

(51) Int. Cl.
G06F 3/00 (2006.01)
(52) U.S. Cl. ...................................... 715/762; 715/763
(58) Field of Classification Search ................. 715/762, 715/764, 763
See application file for complete search history.

(56) References Cited

U.S. PATENT DOCUMENTS

| 5,675,752 A | 10/1997 | Scott et al. |
| 5,710,880 A * | 1/1998 | Howlett et al. .............. 345/468 |
| 5,815,148 A * | 9/1998 | Tanaka ....................... 715/746 |
| 5,844,554 A | 12/1998 | Geller et al. |

(Continued)

FOREIGN PATENT DOCUMENTS

EP    0 706 124    4/1996

(Continued)

OTHER PUBLICATIONS

"Eclipse Platform Technical Overview," Object Technology International, Inc., Jul. 2001, pp. 1-21.

(Continued)

*Primary Examiner*—Kieu Vu
*Assistant Examiner*—Omar Abdul-Ali
(74) *Attorney, Agent, or Firm*—Finnegan, Henderson, Farabow, Garrett & Dunner, L.L.P.

(57) ABSTRACT

An application development supporting apparatus and method that make it possible to easily set and execute various animation representations according to a state of a GUI component are provided. A GUI component is generated based on a logical part and a graphics representation part, and the graphics representation part is made to have an animation execution function based on image files according to the state of the component. By reading and displaying pre-set image data from an image file in accordance with methods that is carried out by a class of a graphics representation component, it becomes possible to carry out various animations with an image that is set according to the state of the component.

5 Claims, 11 Drawing Sheets

U.S. PATENT DOCUMENTS

| | | | |
|---|---|---|---|
| 5,883,639 | A | 3/1999 | Walton et al. |
| 6,222,537 | B1 | 4/2001 | Smith et al. |
| 6,421,694 | B1 | 7/2002 | Nawaz et al. |
| 6,563,517 | B1 * | 5/2003 | Bhagwat et al. ............. 715/735 |
| 7,043,415 | B1 | 5/2006 | Dunlavey et al. |
| 7,093,264 | B2 | 8/2006 | Choi et al. |
| 7,234,111 | B2 * | 6/2007 | Chu et al. .................. 715/251 |
| 2002/0070968 | A1 | 6/2002 | Austin et al. |
| 2002/0109721 | A1 | 8/2002 | Konaka et al. |
| 2002/0163535 | A1 | 11/2002 | Mitchell et al. |
| 2003/0070061 | A1 | 4/2003 | Wong et al. |
| 2005/0071769 | A1 | 3/2005 | Suzuki et al. |

FOREIGN PATENT DOCUMENTS

| | | |
|---|---|---|
| JP | 10-149280 | 6/1998 |
| JP | 11-73259 | 3/1999 |
| JP | 2000-276339 | 10/2000 |
| JP | 2002-244848 | 8/2002 |

OTHER PUBLICATIONS

Ply, Andrea W., "Software Development in ADA and MOTIF Using a GUI Builder," Science Applications International Corp., 1996, pp. 506-510.

"Building Applications with JBuilder," Borland JBuilder 8 Books Online, Oct. 25, 2002.

Spinellis, D., "Unix Tools as Visual Programming Components in a GUI-Builder Environment," Software Practice and Experience 2002; 32:57-71.

Myers, B. et al., "Garnet: GUI," *Nikkei Electronics*, 522: 187-203, 1991.

Tonouchi and Nakajima, "A GUI Library Based on Object Composition", NEC Research, vol. 12, No. 3, 1995, pp. 49-58.

European Search Report for International Application No. PCT/JP03/11037 dated Mar. 13, 2008.

International Search Report mailed Nov. 25, 2003 for International Application No. PCT/JP03/11037.

* cited by examiner

```
+--[application]
   +--Application
   +--[customtoolkit]
      +--CButton.java
      +--CComponentFactory.java
      +--[laf]
         +--[custom]
            +--Button.java
            +--[images]
               +--buttcon_normal.off.gif
               +--buttcon_normal.on.gif
               +--buttcon_pushed.gif
```

FIG. 5

GUI APPLICATION DEVELOPMENT SUPPORT DEVICE, GUI DISPLAY DEVICE, AND METHOD, AND COMPUTER PROGRAM

TECHNICAL FIELD

The present invention relates to a GUI application development supporting apparatus, a GUI display apparatus, method and computer program. More specifically, the present invention relates to a GUI application development supporting apparatus, a GUI display apparatus, method and computer program that make it possible that each component, such as button, list, combo box and the like, that is set in graphical user interface (GUI) is configured as a component executing visually effective animation representation.

BACKGROUND ART

Displays such as CRT and LCD are used as, data display interfaces or data user input/output interfaces for PCs, communications terminals and various information appliances. For such displays, a screen image, for which functions that suit the usage of an information appliance are set, is displayed, for example, as a graphical user interface (GUI). Various functions, such as the arrangement of input buttons, settings for data input fields, processes to be carried out when the buttons are pressed, for example, are set for the GUI. As a programming language for developing application programs for setting the design and functions of such user interface screens, Java, which is distributed by Sun Microsystems, Inc., is used widely.

A program written in Java is converted into byte code as a computer/platform-independent Java executable file format, read by a Java virtual machine (Java VM) and converted (interpreted) into machine language and run on various apparatuses.

In Java, in order to create application software easily in a short period of time, software components that do not require re-compiling are prepared in advance, and programs are created by combining those components. In Java, a technology for making these components reusable (Java Beans) is constructed.

Components are set in units of various components such as, for example, windows to be displayed on a display, buttons, lists, combo boxes, text input fields and the like. For these components, there are defined "property" as attribute information such as, for example, shapes of buttons, position information and the like, "method" as a process as the result of an action for a component, and further "event" as a function for, when an action with respect to a component, such as the arrival of data, the occurrence of an interruption, the alteration of properties, the calling of a method or the like, occurs, communicating the event to another component. These "properties," "methods" and "events" are taken to be elements of components in Java Beans.

The smallest executable program unit in Java is referred to as "class" and a Java Program is constituted by one or more classes. A class has a variable as data and a method as an action. It is possible to forward and store this program component that is set as a class to a PC or an information appliance through a network such as the Internet or a LAN, and on the side of the apparatus in which the class file is stored, a platform-independent Java virtual machine is able to run the program saved in the class file.

As described above, the various components that constitute a GUI, such as buttons, lists, combo boxes, text input fields and the like, are set as components that have attribute information, as property, such as their shapes, position information and the like, and further, for which functional information such as methods, events and the like are defined.

In other words, the logical part that defines functions like, for example, the process to be carried out when turned on, the process to be carried,out when turned off or the like, of a component (GUI component), such as a button or the like, that is set on a graphical user interface, and the display image of the component, that is, the graphics representation part, are integrated. In the programming process for designing a GUI, various applications are designed by selecting and setting components in which the logical part and the graphics representation part are integrated.

Thus, for example, in case of setting animations as a displaying process at the time of the button as a component being on or off, the animations are basically set as fixed ones, and they are difficult to change.

However, the optimum graphics images differ by device on which the GUI is installed, animations that someone wants to set sometimes differ by device. For example, animation-laden settings are adopted in devices that children manipulate, simple animation settings are adopted in business-oriented devices and the like. Further, the optimum graphics images differ by performance such as memory, CPU and the like of device itself.

DISCLOSURE OF THE INVENTION

The present invention is made in view of the problems described the above, and an object thereof is to provide a GUI application development supporting apparatus, a GUI display apparatus, method and computer program that make it possible to freely set various animation on each component that is set in a graphical user interface and make it possible to set different animation as different graphics representation depending on devices.

The first aspect of the present invention is a GUI application development supporting apparatus for supporting the development of a GUI application that has setting information for functions and display modes of components constituting a graphical user interface (GUI), the GUI application development supporting apparatus characterized by including:

a graphics representation component storage section that stores graphics representation components in which programs related to graphics representation of the components are stored;

an image storage section that stores animation image data that is readable in accordance with a method defined for the graphics representation components; and an edit processing section that executes processes of associating image data that is read in accordance with the state of the components.

Further, an embodiment of a GUI application development supporting apparatus of the present invention is characterized in that the edit processing section has a configuration that enables setting of different read image data in association with each state of a plurality of different components.

Further, an embodiment of a GUI application development supporting apparatus of the present invention is characterized in that the graphics representation component storage section includes a plurality of graphics representation components in which a plurality of distinct graphics representation processing execution programs is stored, and in that graphics representation components stored in each graphics representation component storage section may have configurations in which they are individually associated with the read image files.

Further, an embodiment of a GUI application development supporting apparatus of the present invention is characterized by further including a logical component storage section storing a logic component storing a program related to function of component, characterized in that the edit processing section is of a configuration in which a GUI component is generated by combining a logical component extracted from the logical component storage section and a graphics representation component extracted from the graphics representation component storage section.

Further, the second aspect of the present invention is a GUI application program generating method that generates a GUI application having setting information for functions and display modes of components constituting a graphical user interface (GUI), the GUI application program generating method characterized by including:

a graphics representation component selection step of selectively extracting a graphics representation component from a graphics representation component storage section that stores graphics representation components in which programs related to graphics representation of the components are stored; and an edit processing step of executing a process of associating image data to be read according to a state of the component corresponding to the graphics representation component selected at the graphics representation component selection step.

Further, an embodiment of a GUI application program generating method of the present invention is characterized in that the edit processing step includes a step of setting individually animation image data to be read according to a method defined for the graphics representation component in association with each state of a plurality of distinct components.

Further, an embodiment of a GUI application program generating method of the present invention is characterized by further including the GUI application program generating method further includes a step of reading a logical component from a logical component storage section that stores logical components in which programs related to functions of components, characterized in that the edit processing step includes a step of generating a GUI component by combining a logical component extracted from the logical component storage section and a graphics representation component extracted from the graphics representation component storage section.

Further, the third aspect of the present invention is a GUI display apparatus that executes animation representation of a GUI component on a display, the GUI display apparatus characterized by including control means for executing display control of a GUI component to be displayed on a display, characterized in that the control means is of a configuration that enables to read a graphics representation class of a graphics representation component in association with a component and executes it, and read image data that is set in advance corresponding to the component from an image file stored in a storage section in accordance with animation index methods that are called in the class executing process and executes a process of outputting the read image data on a display.

Further, an embodiment of a GUI display apparatus of the present invention is characterized in that the control means is of a configuration that enable to identify a state of the component, read image data according to the state of the component from the storage section, and execute a process of displaying the image data on a display.

Further, the fourth aspect of the present invention is an animation display processing method for a GUI component to be displayed on a display, the animation display processing method characterized by including:

a class execution step of executing a graphics representation class of a graphics representation component that is associated with a component;

an image reading step of reading pre-set image data from an image file in accordance with animation index methods called at the class execution step; and a step of displaying on a display the image data read at the image reading step.

Further, an embodiment of an animation display processing method of the present invention is characterized in that an image read at the image reading step is an image data according to a state of the component.

Further, the fifth aspect of the present invention is a computer program that executes a process of generating a GUI application program having setting information for functions and display modes of components constituting a graphical user interface (GUI), the computer program characterized by including:

a graphics representation component selection step of selectively extracting a graphics representation component from a graphics representation component storage section that stores graphics representation components in which programs related to graphics representation of the components are stored; and an edit processing step of executing a process of associating image data to be read according to a state of the component corresponding to the graphics representation component selected at the graphics representation component selection step.

Further, the sixth aspect of the present invention is a computer program that executes animation displaying process for a GUI component to be displayed on a display, the computer program characterized by including:

a class execution step of executing a graphics representation class of a graphics representation component that is associated with a component;

an image reading step of reading pre-set image data from an image file in accordance with an animation index method called at the class execution step; and a step of displaying on a display the image data read at the image reading step.

According to a configuration of the present invention, it becomes possible to freely set an animation of each component that is set in a GUI, and settings of optimal component animation that corresponds to GUI-equipped devices are easily carried out. That is, since the present invention is provided with a configuration that allows to read and display pre-set image data from an image file in accordance with animation index methods that are carried out by a graphics representation class of a graphics representation component that is included in a component, it becomes possible to carry out an animation with an image that is set according to the state of the component and it becomes possible to carry out animation representation with visual effectiveness according to the state of the GUI component.

Further, according to a configuration of the present invention, since the configuration is adopted in which the logical part and the graphics representation part of a component are configured separately, a GUI component is generated based on the logical part and the graphics representation part, and the graphics representation part is made to have an animation execution function based on image files according to the state of the component, it becomes possible to change with ease the setting mode of animation through a process that is independent of the logical part.

In addition, a computer program of the present invention is a computer program that can be provided to, for example, a general-purpose computer system, which is capable of running various program codes, through storage media and communications media that provide them in a computer readable format, examples of which include recording media such as CDs, FDs, MDs and the like, or communications media such as networks. By providing such a program in a computer readable format, a process according to the program is realized on a computer system.

Other objects, features and advantages of the present invention should become apparent from a more detailed description based on embodiments of the present invention that are described below and from the appended drawings. A system as used in the present description refers to a logical aggregate configuration of a plurality of apparatuses, and is not limited to one in which each constituent apparatus resides in the same body.

BRIEF DESCRIPTION OF THE DRAWINGS

FIG. 5 is a diagram illustrating an example of a file configuration necessary for executing processes of a GUI application development supporting apparatus of the present invention;

BEST MODES FOR CARRYING OUT THE INVENTION

Figure 1:
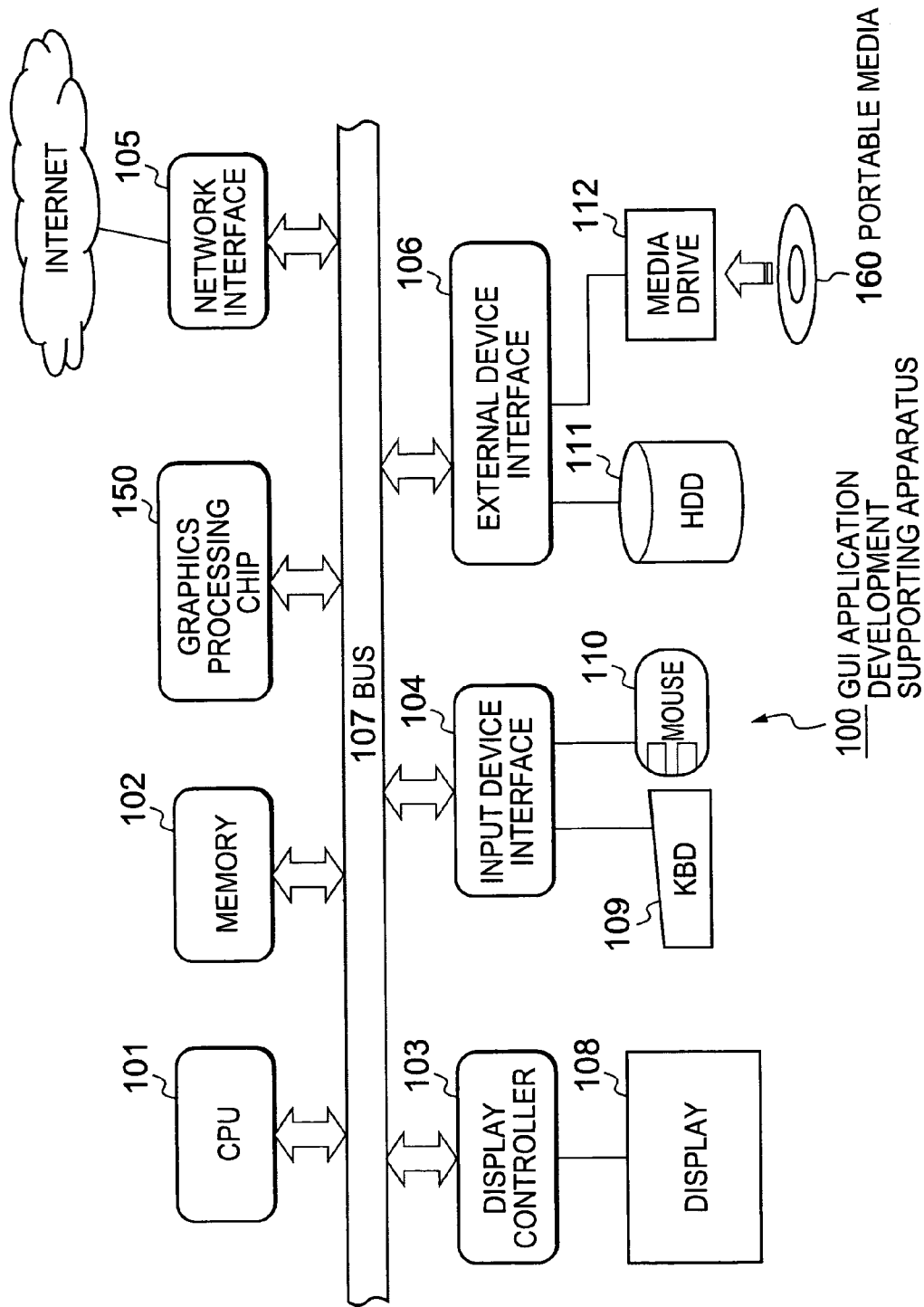
FIG. 1 is a diagram showing a hardware configuration example of a GUI application development supporting apparatus of the present invention.

Below, a GUI application development supporting apparatus, a GUI display apparatus, method and computer program of the present invention will be described in detail with reference to the drawings.

[1. Hardware Configuration]

First, a hardware configuration example of a GUI application development supporting apparatus of the present invention will be described with reference to FIG. 1. Each element within a GUI application development supporting apparatus 100 will be described with reference to FIG. 1. A CPU (Central Processing Unit) 101, which is the main controller of the GUI application development supporting apparatus 100, executes various kinds of GUI application development programs under the control of an operating system (OS). The CPU 101 performs, for example, the execution of a program creating process based on the Java language, specifically processes of setting functions, setting the display image and the like of each component, such as buttons, combo boxes and the like, that is set on a GUI screen. As shown in drawing, the CPU 101 is interconnected with other constituent parts through a bus 107.

A memory 102 is a storage device that is used to store program codes to be run by the CPU 101 or to temporarily store working data under execution. The memory 102 shown in the same diagram includes both a non-volatile memory such as ROM as well as a volatile memory such as DRAM.

A graphics processing chip 150 is a chip into which is incorporated a dedicated processing circuit that executes color processing for various GUI components.

A display controller 103 as a display control section is a dedicated controller for actually processing draw commands issued by the CPU 101. The draw data processed by the display controller 103 is screen outputted by a display 108 after, for example, being once written in a frame buffer (not shown) For example, an image reproduced from a HDD (111) or an image processed by the CPU 101 may be displayed on the display 108, and a user may view the presented screen.

An input device interface 104 is an apparatus for connecting user input devices, such as a keyboard 109, a mouse 110 and the like, to the GUI application development supporting apparatus 100. The user is able to input commands for processing or displaying images and the like through the keyboard 109 and the mouse 110.

In compliance with a predetermined communications protocol such as Ethernet, a network interface 105 is capable of connecting the GUI application development supporting apparatus 100 to a local network such as a LAN (Local Area Network), and further to a wide area network such as the Internet.

A plurality of host terminals and servers (not shown) are connected on a network in a transparent state and a distributed computing environment is constructed. Distribution services of software programs and data contents can be provided on the network. For example, image data from another server in which moving images, still images and the like are stored can be downloaded to the HDD (111) via the network.

An external device interface 106 is an apparatus for connecting external apparatuses, such as a digital camera, the hard disk drive (HDD) 111, a media drive 112 and the like, to the GUI application development supporting apparatus 100.

The HDD 111 is an external storage apparatus in which a magnetic disk as a storage medium is fixedly mounted, and is advantageous in terms of storage capacity, data transfer rate and the like, and allows for random access. For example, program installation where a software program is stored on the HDD 111 in an executable condition is possible. On the HDD 111, program codes of the operating system, application programs and device drivers to be run by the CPU 101 are stored in a non-volatile manner.

The media drive 112 is an apparatus into which portable media 160, such as a CD (Compact Disc), an MO (Magneto-Optical disc), a DVD (Digital Versatile Disc) and the like, can be loaded, and which is for accessing the data recording surface thereof.

The portable media 160 are used primarily for purposes such as backing up software programs, data files and the like as data in a computer readable format, and transferring them between systems (that is, including sales, circulation and distribution). It is possible to physically circulate and distribute an application program for performing various processes between a plurality of devices using these portable media.

In addition, an apparatus such as the one shown in FIG. 1 can be realized as a compatible machine or a succeeding machine of IBM Corporation's personal computer "PC/AT (Personal Computer/Advanced Technology." Naturally, it is also possible to apply a computer equipped with a different architecture.

[2. Functional Configuration]

Next, the functional configuration of a GUI application development supporting apparatus of the present invention that develops a GUI application by separately configuring the logical part and the graphics representation part of each component that is set in a graphical user interface (GUI) will be described with reference to FIG. 2.

Figure 2:
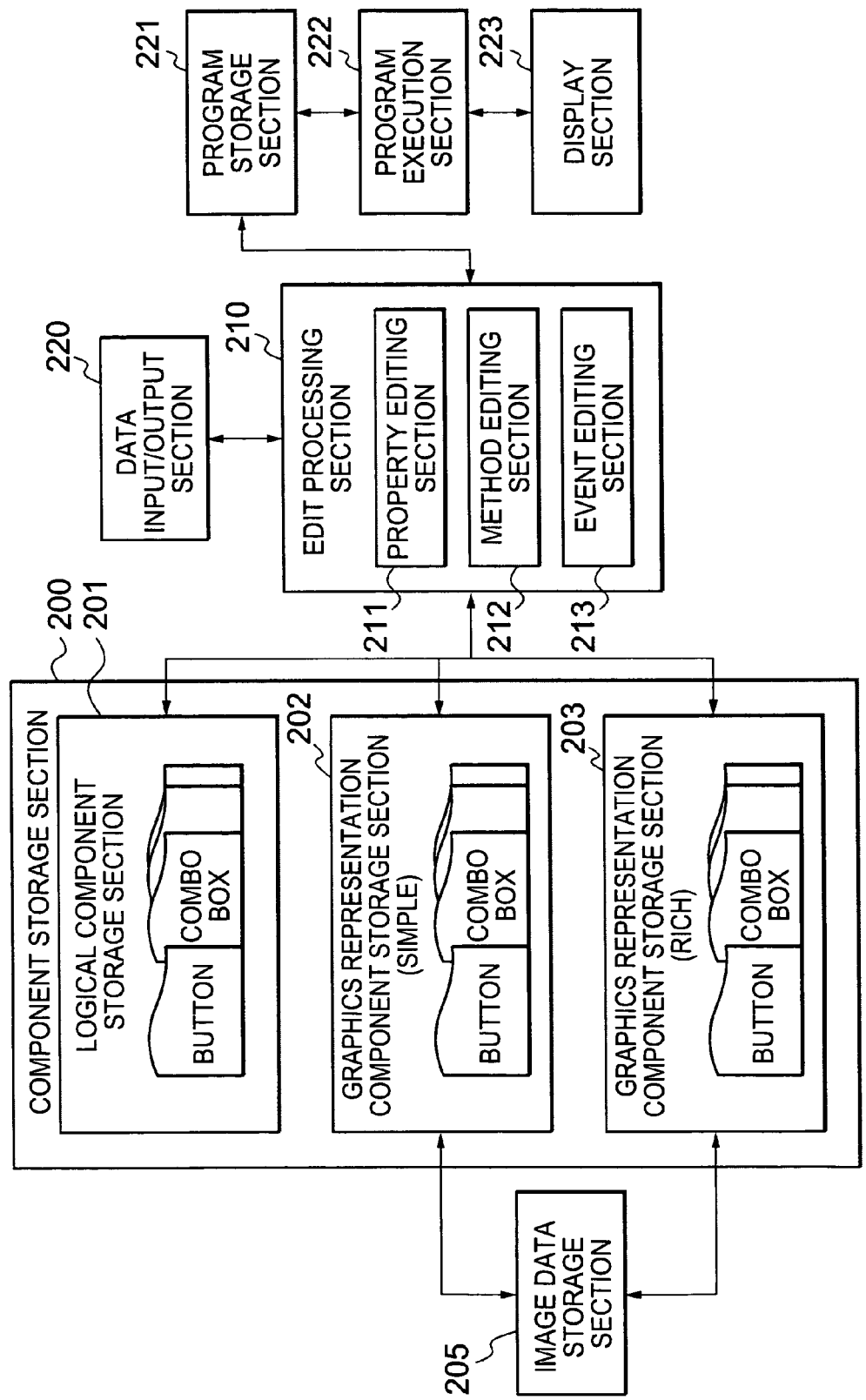
FIG. 2 is a block diagram showing the functional configuration of a GUI application development supporting apparatus of the present invention.

As shown in FIG. 2, a GUI application development supporting apparatus of the present invention has a component storage section 200 in which various parts (components) to be set on a screen that is to serve as a user interface, such as buttons, combo boxes, lists, windows, text boxes and the like, are stored. The component storage section 200 includes a logical component storage section 201, a graphics representation component storage section (Simple) 202 and a graphics representation component storage section (Rich) 203.

The logical component storage section 201 is a component that stores logical information regarding various parts (components) to be set on a screen that is to serve as a user interface, such as buttons, combo boxes, lists, windows, text boxes and the like. For example, if it were a button, it is configured as a software program component that defines functions, such as the process for when it is turned on, the process for when it is turned off and the like, as functions of the button.

On the other hand, the graphics representation component storage section (Simple) 202 and the graphics representation component storage section (Rich) 203 are configured as software program components that store display image information of components, that is, as software program components that store a graphics representation program. The graphics representation component storage section (Simple) 202 and the graphics representation component storage section (Rich) 203 are components that each store a program that executes a different graphics representation.

An image data storage section 205 stores image data such as, for example, jpeg, gif and the like. By associating these image data with the graphics representation component of each component, animation display based on image data according to various operations of components becomes possible. Such animation setting processes will be described later.

An operator as a developer of GUI application programs executes various data input with respect to an edit processing section 210 via a data input/output section 220, and constructs a GUI component by setting the function and graphical image of each component, such as a button, combo box or the like.

A creation process execution program for components is, for example, one class (factory class) of a JAVA program. The edit processing section 210 creates various components by executing the factory class. In addition, processing by the edit processing section 210 is, in the case of the hardware configuration shown in FIG. 1, is processing executed under the control of the CPU 101.

Components are edited at the edit processing section 210 as GUI components for which "property" as attribute information such as, for example, shapes of buttons, position information and the like, "method" as a process as the result of an action for a component, and further "event" as a function for, when an action with respect to a component, such as the arrival of data, the occurrence of an interruption, the alteration of properties, the calling of a method or the like, occurs, communicating the event to another component are defined.

The edit processing section 210 includes a property editing section 211 that edits properties set for components, a method editing section 212 that edits methods, and an event editing section 213 that edits events.

In setting the look, that is, the graphics representation, of a GUI component to be generated, the operator inputs look & feel package specification data with respect to the edit processing section 210 that executes the factory class. In other words, the operator specifies either "Rich" or "Simple."

In accordance with this specification data, the factory class is executed at the edit processing section 210, and depending on the specification data, the corresponding program component is read from either the graphics representation component storage section (Simple) 202 or the graphics representation component storage section (Rich) 203, while at the same time the component is generated along with a component read from the logical component storage section 201.

For example, in generating a GUI component with respect to a button, a button component is read from the logical component storage section 201 that stores components in which logical information regarding components is stored, and further, depending on the look & feel package specification data from the operator, namely the specification data of either "Rich" or "Simple," a component storing a graphics representation program of the button is read from the graphics representation component storage section (Simple) 202 or the graphics representation component storage section (Rich) 203, and a single button component is generated by combining the logical component and either the "Rich" or "Simple" graphics representation component.

A similar editing process is executed for various components other than buttons, such as combo boxes, lists, windows, text boxes and the like, and after the editing process, the set GUI application program is stored in a program storage section 221, executed at a program execution section 222, and the generated GUI is displayed on a display section 223.

In addition, in the embodiment described above, an example was described where only the two types of "Simple" and "Rich" were set for components that store a graphics representation program, but the number of types may also be set to an arbitrary number of 3 and above, and the operator may input some specification data of the graphics representation components that are set, whereby a graphics representation component is selected in accordance with the specification data, and various GUI components created.

[3. Processing Sequence]

Next, the procedures in a process for generating a GUI component by applying a GUI application development supporting apparatus of the present invention will be described with reference to FIG. 3 and FIG. 4.

Figure 3:
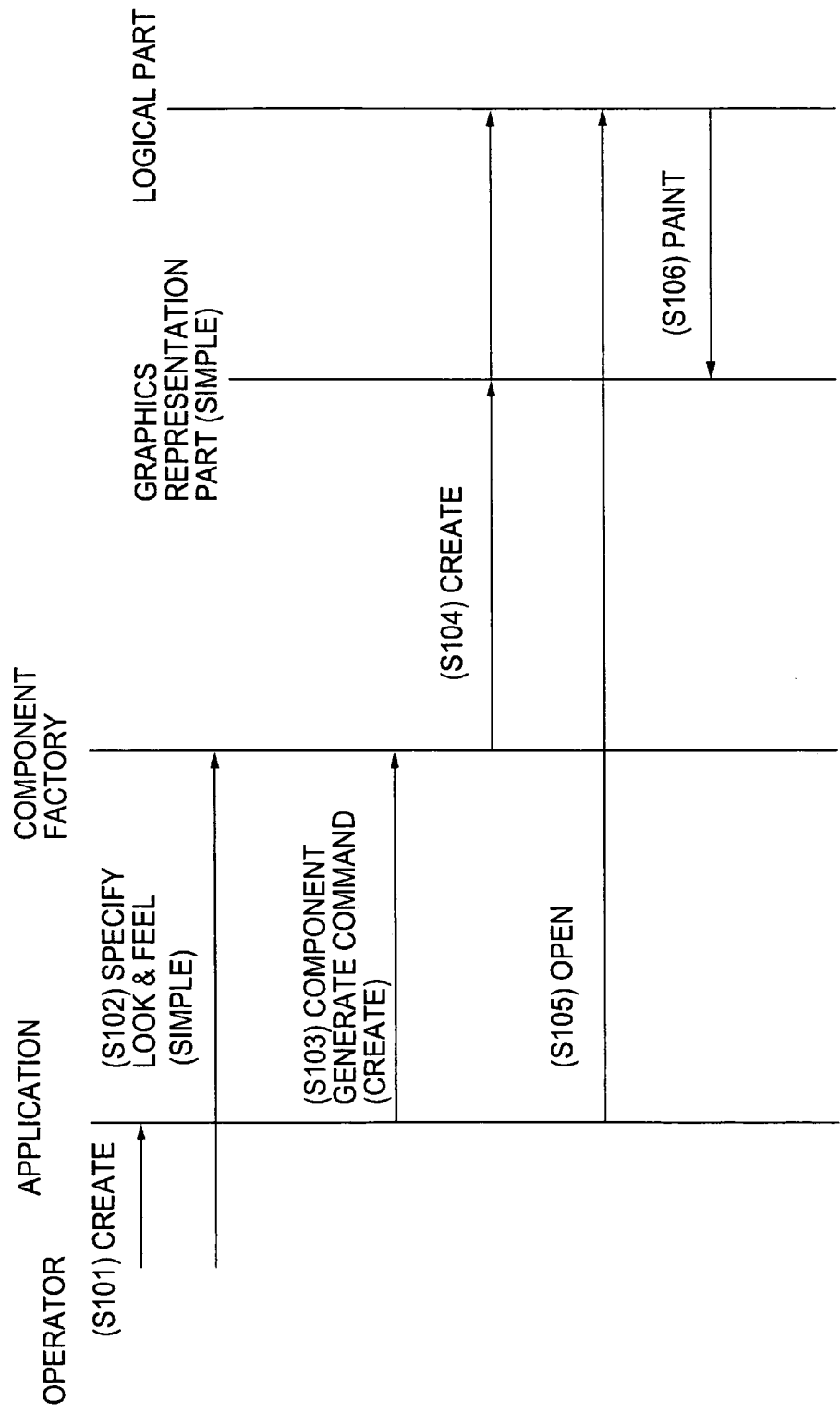
FIG. 3 is a sequence diagram illustrating the processing sequence of a GUI application development supporting apparatus of the present invention.

FIG. 3 is a diagram that shows a processing sequence in which the "Simple" graphics representation component is selected and a GUI component generated. In FIG. 3, there is shown, from the left, each of the processes of the operator, GUI generating application, component factory, graphics representation part and logical part. The processes of the graphics representation part and the logical part correspond to the execution of the programs stored in the components read from the graphics representation component storage section (Simple) 202 and the logical component storage section 201 shown in FIG. 2, and these processes as well as the process of the component factory are executed at the edit processing section 210 in FIG. 2.

First, in step S101, the operator inputs a create command (Create) for a GUI component to the GUI generating application. This create command (Create) for the GUI component is inputted along with data that specifies the kind of the component, such as, for example, "button," "list," "combo box," "radio button," "window" and the like.

Further, in step S102, a "look & feel" specification for specifying the graphics representation is outputted from the operator to the component factory via the application. Here, it is assumed that "Simple" is specified as the "look & feel" specification.

Next, in step S103, a component create command is outputted to the component factory from the application. Identification data that indicates the component kind specified in the previous step S101 is included in this command.

In step S104, the component create command (Create) is outputted from the component factory with respect to the graphics representation part (Simple) and the logical part, and the creation of a component is executed in accordance with the stored programs of the logical part and the graphics representation part.

The processes subsequent to step S105 show a processing sequence in a case where a component is processed by the application, for example as in when an open process command for a "window" as a component is performed. An open process command for a component from the application is handed to the logical part, and based on the execution of the program of the logical part, a paint command is handed to the graphics representation part (Simple). The graphics representation part (Simple) executes paint processing for the component based on the inputted command from the logical part.

Here, since the graphics representation part adopted for component generation is "Simple," the generated component to be displayed on the display, namely buttons and the like, take on a simple configuration-in which color settings by paint are done.

Next, a processing sequence in which the "Rich" graphics representation component is selected and a GUI component generated will be described with reference to FIG. 4. As in FIG. 3, from the left, there are shown each of the processes by the operator, GUI generating application, component factory, graphics representation part and logical part. As in FIG. 3, the processes of the graphics representation part and the logical part correspond to the execution of the programs stored in the components read from the graphics representation component storage section (Simple) 202 and the logical component storage section 201 shown in FIG. 2, and these processes as well as the process of the component factory are executed at the edit processing section 210 in FIG. 2.

First, in step S201, the operator inputs a create command (Create) for a GUI component to the GUI generating application. This create command (Create) for the GUI component is inputted along with data that specifies the kind of the component, such as, for example, "button," "list," "combo box," "radio button,""window" and the like.

Further, in step S202, a "look & feel" specification for specifying the graphics representation is outputted from the operator to the component factory via the application. Here, it is assumed that "Rich" is specified as the "look & feel" specification.

Next, in step S203, a component create command is outputted to the component factory from the application. Identification data that indicates the component kind specified in the previous step S201 is included in this command.

In step S204, the component create command (Create) is outputted from the component factory with respect to the graphics representation part (Simple) and the logical part, and the creation of a component is executed in accordance with the stored programs of the logical part and the graphics representation part (Rich).

The processes subsequent to step S205 show a processing sequence in a case where a component is processed by the application, for example as in when an open process command for a "window" as a component is performed. An open process command for a component from the application is handed to the graphics representation part, and animation is executed (S206) based on the execution of an animation program stored in the graphics representation part.

Further, in step S207, the open process command is handed to the logical part, and based on the execution of the program of the logical part, a paint command is handed to the graphics representation part (Simple), and the graphics representation part (Rich) executes paint processing for the component in accordance with the inputted command from the logical part.

Figure 4:
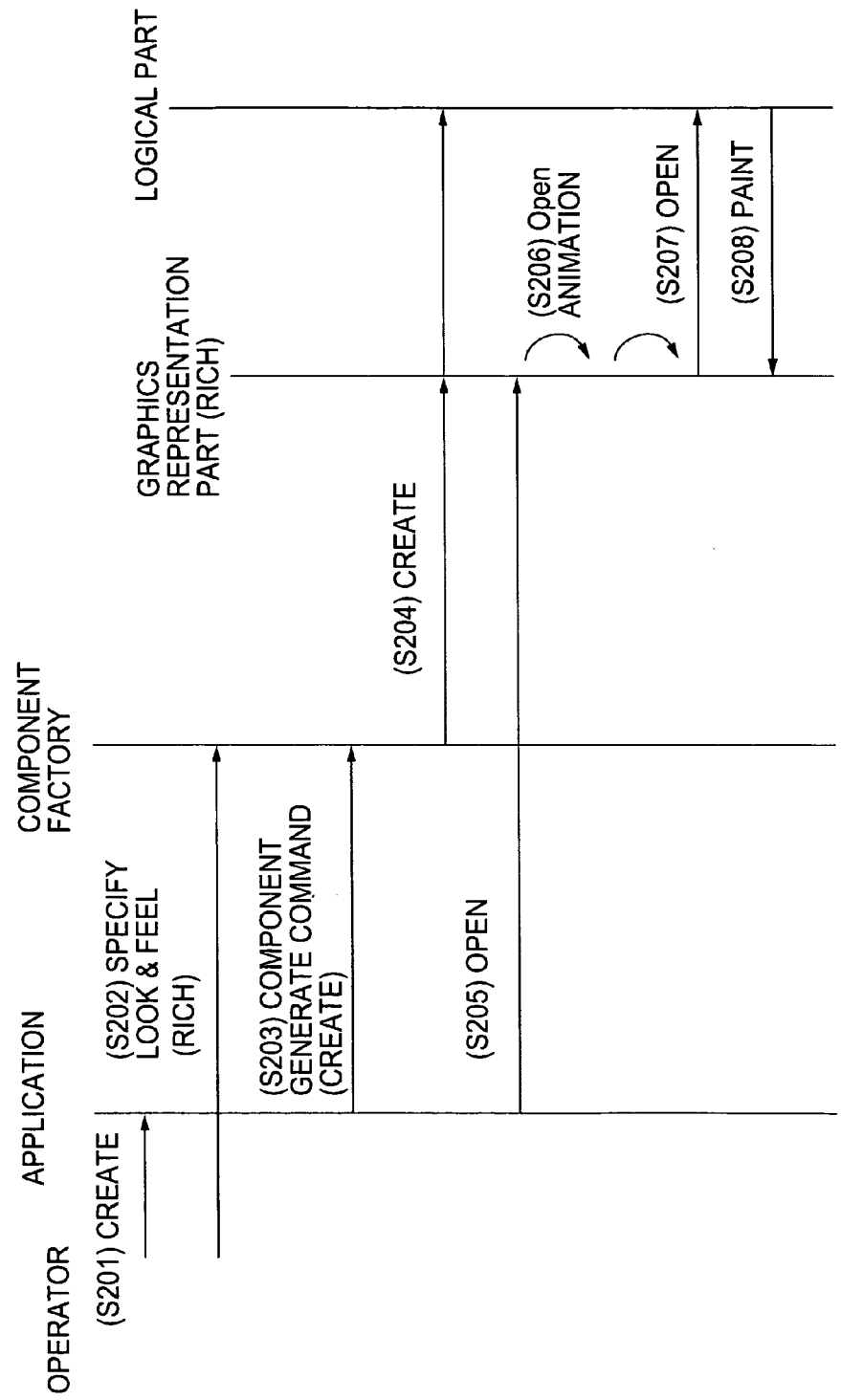
FIG. 4 is a sequence diagram illustrating the processing sequence of a GUI application development supporting apparatus of the present invention.

In the sequence diagram shown in FIG. 4, since the graphics representation part adopted for component generation is "Rich," the generated component to be displayed on the display, namely buttons and the like, take on a configuration in which not only color settings by paint are done, but also animation representation is executed.

[4. File Configuration Example]

A file configuration example for executing such component display as mentioned above will be described.

For example, as files in a case where a "buttcon" component, as an icon having the functionality of a button as an example of a GUI component, is configured as a GUI component, each of the following files, for example, becomes necessary.

Cbuttcon.java: a class for implementing the logical part of the buttcon,

Buttcon.java: a class for implementing the look & feel part as the graphics representation part of the buttcon, buttcon_normal_off.gif: the image when the buttcon is "off,"

buttcon_normal_on.gif: the image when the buttcon is "on,"

buttcon_pushed.gif: the image when the buttcon is being pushed,

CComponentFactory.java: a factory class, which the application uses to create the buttcon;

Application.java: an application for displaying the created buttcon.

A class refers to an executable unit of program in Java.

The directory configuration of each of the files above is shown in FIG. 5. A [customtoolkit] file as a tool kit exists below some GUI application file [application], and in this file are included CButtcon.java: a class for implementing the logical part of the buttcon, CComponentFactory.java: a factory class that the application uses to create the buttcon and further a look & feeel file [laf] as graphics representation information.

Buttcon.java: a class for implementing the look & feel part as the graphics representation part of the buttcon, that is, a class corresponding to the graphics representation component described above, is included in the look & feeel file [laf]. Further, as image data files [image], each of buttcon_normal_off.gif: the image for when the buttcon is "off," buttcon_normal_on.gif: the image for when the buttcon is "on," and buttcon_pushed.gif: the image for when the buttcon is being pushed is included.

The GUI application program, in accordance with the user's input information, executes a process in which the processing programs and image data included in each of these files are applied. Specifically, both various function executing processes that follow the program of the logical part class as well as various graphics representation processes that follow the program of the graphics representation part class are executed.

[5. Display Example]

Next, with reference to FIG. 6 and FIG. 7, a display processing example for GUI components generated based on a configuration in which the logical part and the graphics representation part of each component are separated will be described.

Figure 6:
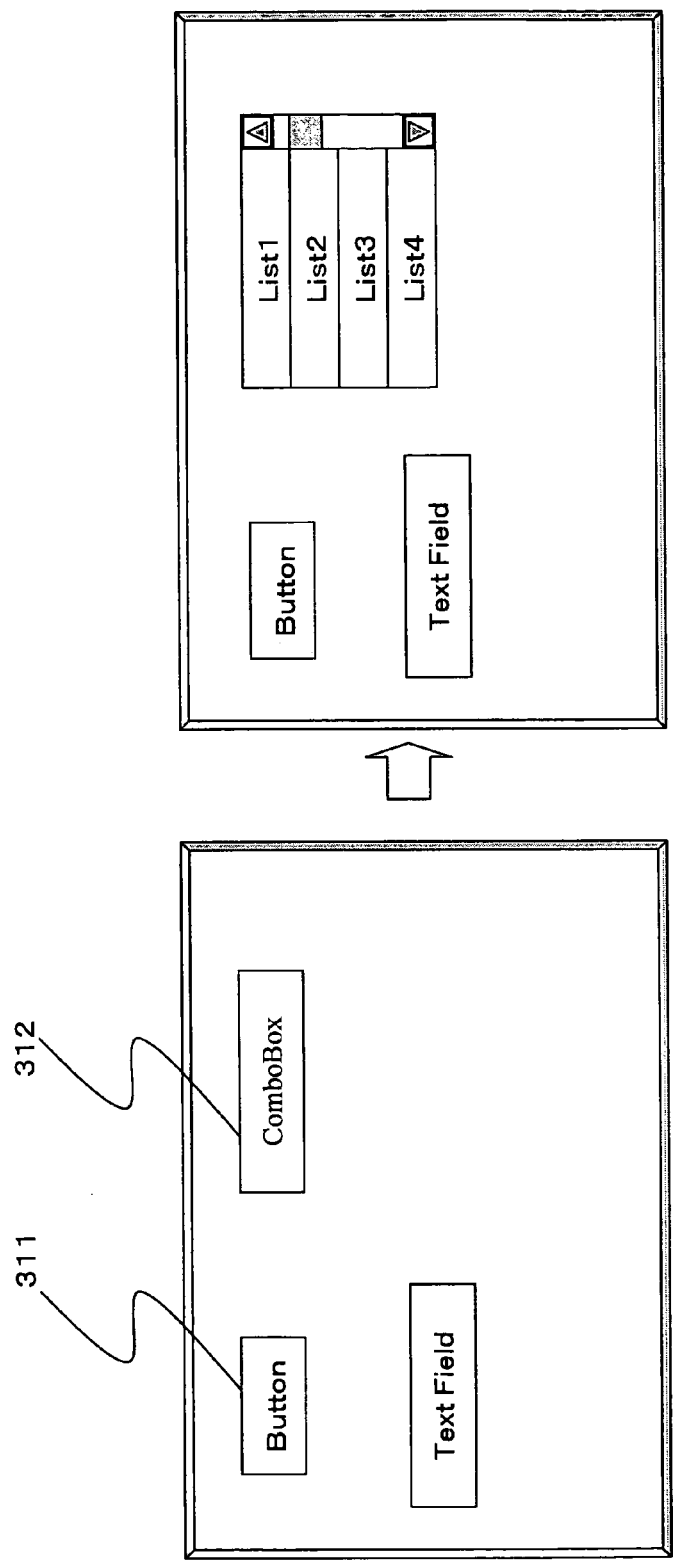
FIG. 6 is a diagram illustrating a display example of a GUI component generated with a GUI application development supporting apparatus of the present invention.

FIG. 6 shows an example in which each component is generated and displayed while applying the graphics representation part (Simple). A description will be given taking a button 311 and a combo box 312 as examples of GUI components.

When the button 311 is manipulated, for example when the button is turned on, turned off, or when focus settings, in other words cursor settings, are carried out, processes based on on and off operations of the button are executed by processes of the logical part of the button component. Further, through, for example, a paint command from the logical part, the graphics representation part (Simple) is executed, and paint processing, that is, a process of changing the displayed color of the button, is carried out.

When the combo box 312 is manipulated, for example when the combo box 312 is opened, closed, etc., processes based on opening and closing operations of the combo box are executed by processes of the logical part of the combo box component. Further, through, for example, a paint command from the logical part, the graphics representation part (Simple) of the combo box component is executed, and paint processing, that is, a process such as changing the displayed color of the combo box, is carried out.

In addition, what kind of graphics representation is to be executed through a process from the operator may be set differently for each GUI component. In other words, by altering the processing program of the graphics representation part (Simple), graphics representation processing that suits each component becomes possible.

Figure 7:
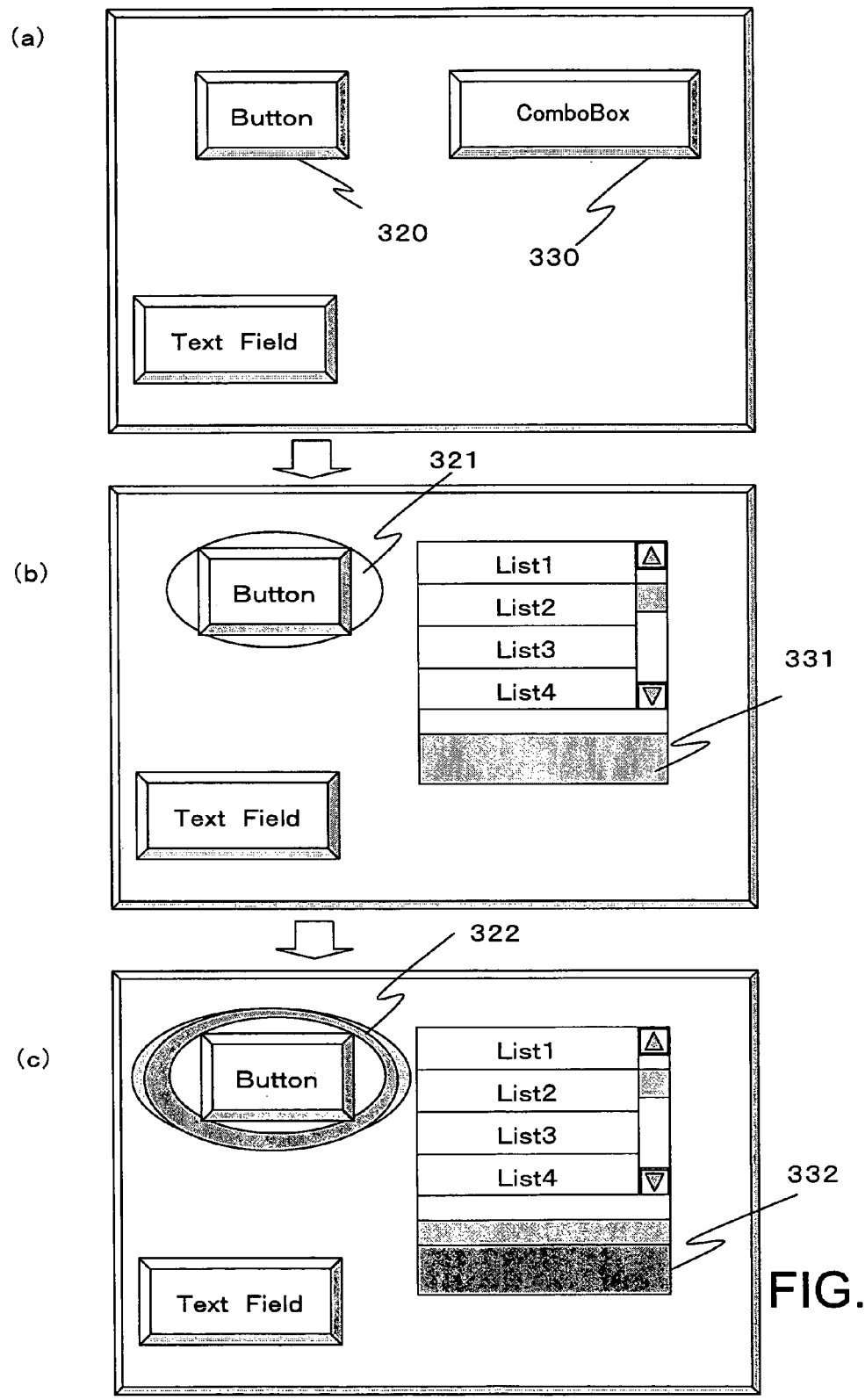
FIG. 7 is a diagram illustrating a display example of a GUI component generated with a GUI application development supporting apparatus of the present invention.

FIG. 7 shows an example in which each component is generated and displayed while applying the graphics representation part (Rich). A description will be given taking a button 320 and a combo box 330 as examples of GUI components.

When the button 320 is manipulated, for example when the button is turned on, turned off, or when focus settings, in other words cursor settings, are carried out, animation 321 and 322 are executed as processes of the graphics representation part (Rich) of the button component in addition to the paint processing described above. Though it is hard to see from the diagram, in (b) and (c), an animation where a ripple propagates around the button is executed. In addition, through processes of the logical part, processes based on on and off operations of the button are executed.

When the combo box 330 is manipulated, for example when the combo box 330 is opened, closed, etc., processes based on opening and closing operations of the combo box are executed by processes of the logical part of the combo box component, while at the same time animations 331 and 332 are executed as processes of the graphics representation part (Rich) of the combo box component. Though it is hard to see from the diagram, in (b) and (c), an animation that is set so that it extends downward from the lower portion of the combo box is executed.

[6. Animation Setting and Executing Process]

Next, a process of setting and executing animation for GUI components, such as windows, buttons, combo boxes, lists and the like, will be described.

Figure 8:
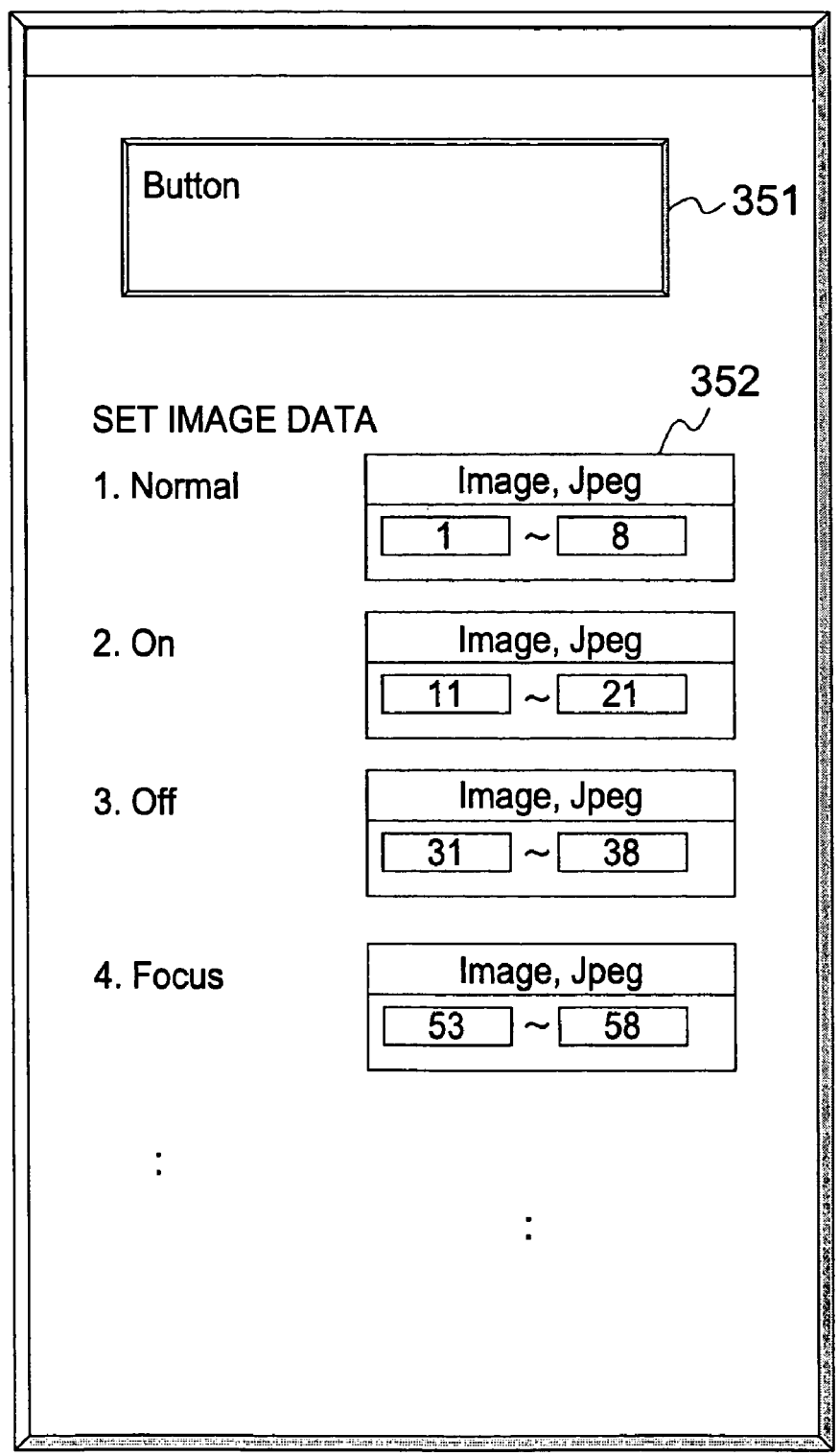
FIG. 8 a diagram illustrating an example of a process, which is executed with a GUI application development supporting apparatus of the present invention, of setting animation corresponding to the state of each component.

FIG. 8 is a diagram showing a processing screen for setting image data for executing animation with respect to a component. A configuration is adopted where component [Button] is set in a component specifying field 351, an image data setting field 352 is configured there below, and the image to be called (jpeg) at each component state, that is under a normal state, or under on, off and focus settings and the like, can be set individually. Focus setting refers to a state where a cursor is set on that component, and the component is in a state where it is capable of operations such as on and off.

For example, when an on process is to be carried out, an animation index method is called and executed in accordance with a program defined for the graphics representation component. Through the execution of the animation index method, Jpeg images 11 through 21 are read from image file [Image], and the image of a button displayed on the GUI based on these plurality of images is displayed in animation. When an off process is to be carried out, Jpeg images 31 through 38 are read from image file [Image], and the image of a button displayed on the GUI based on these plurality of images is displayed in animation In the example shown in FIG. 8, there is shown an example having the four states of Normal, On, Off and Focus as component states. However, state definitions are not limited to these, and may be defined as follows, for example, and such a configuration may be adopted where image data is set according to each state.

NORMAL: a normal state

NORMAL DEACTIVATED: a normal state that is not active

FOCUSED: a focused state

FOCUSED DEACTIVATED: a focused state that is not active

PUSHED: a pushed state

PUSHED DEACTIVATED: a pushed state that is not active

DISABLED: an inoperable state

DISABLE DEACTIVATED: an inoperable state that is not active

By setting different image data that constitute animation in association with each of the eight states above, it becomes possible for a user to understand the state of a component according to the animation. In addition, a state that is not active refers to cases such as a state where it is displayed in a window that is not subject to operation.

Thus, for each component, individual image files can be set so as to correspond to processes, and it becomes possible to freely set optimal animation representation that corresponds to various processes. In the drawing, there is shown an example where an animation for a button is being set, but, similarly, setting animations that correspond to various processes is possible for other components, too.

For example, various animations are set by having images each individually selected and set from image files for an animation at open, an animation at close and the like for a combo box.

A GUI application development supporting apparatus for executing the animation display setting process described above by setting image data corresponding to the state of each component is realized through the configuration previously described with reference to FIG. 1 and FIG. 2. However, a processing configuration limited to the function for carrying out the process of setting image files according to each component state will be described with reference to the block diagram shown in FIG. 9.

Figure 9:
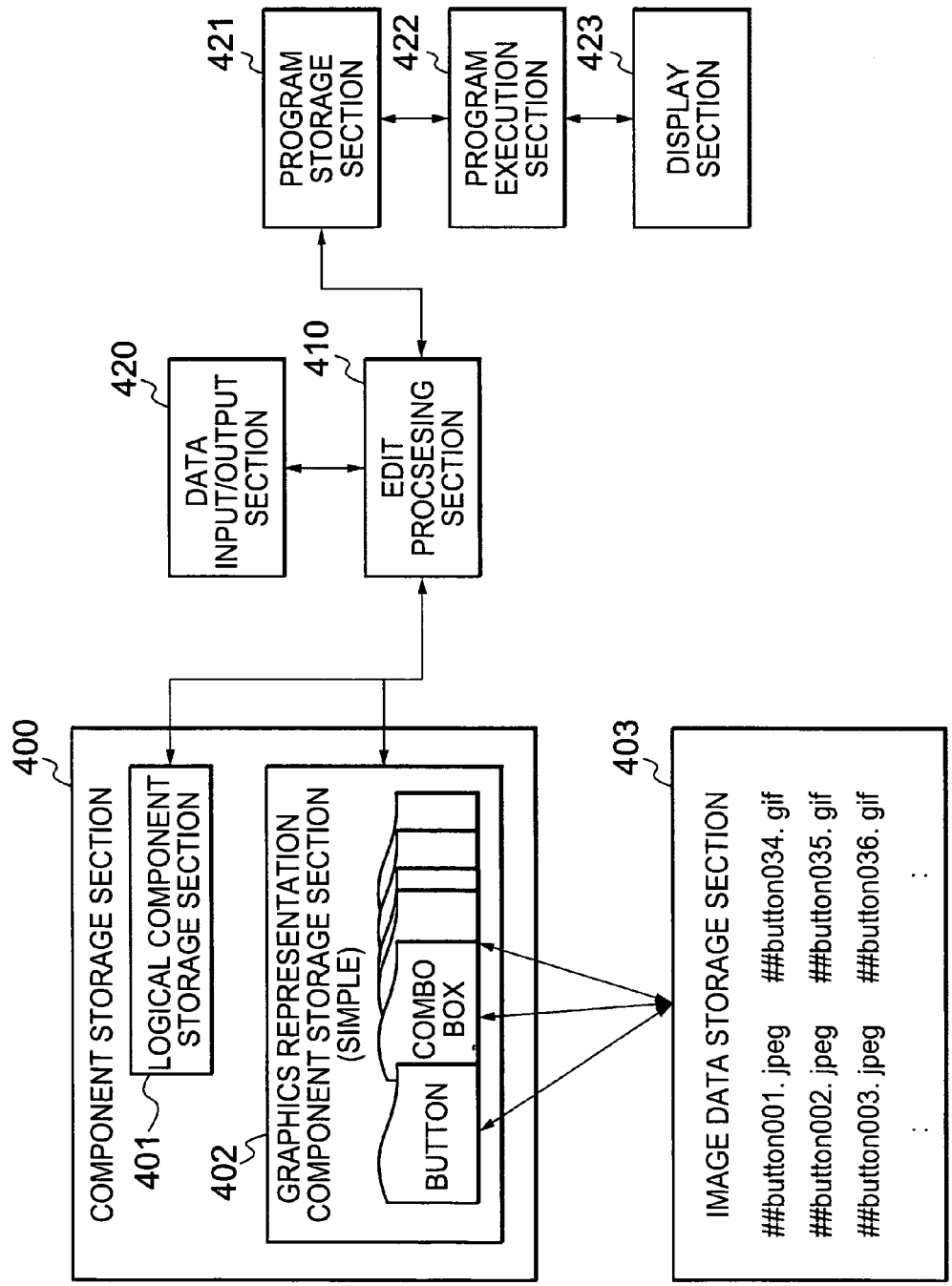
FIG. 9 is a block diagram showing a functional configuration for setting an animation process of a component with a GUI application development supporting apparatus of the present invention.

As shown in FIG. 9, the GUI application development supporting apparatus has a component storage section 400 that stores various components, such as buttons, combo boxes, lists, windows, text boxes and the like, to be set on a screen as a user interface. The component storage section 400 has a logical component storage section 401 as a software program component that defines the processing functions of components, and a graphics representation component storage section 402 as a software program component that defines the graphics representation of components. In addition, graphics representation components may be, as described above, configured as a plurality of different components that execute a plurality of kinds of graphics representations such as Simple, Rich, and the like.

An image data storage section 403 stores image data that are read in accordance with animation index methods that are called by executing a graphics representation class as a program stored in the graphics representation components stored in the graphics representation component storage section 402. Image data are data files of, for example, jpeg, gif and the like, and correspond to each of the graphics representation components stored in the graphics representation component storage section 402.

An operator as a developer of GUI application programs executes various data input with respect to an edit processing section 410 via a data input/output section 420, and constructs a GUI component by setting the function and graphical image of each component, such as a button, combo box or the like.

A creation process execution program for components is, for example, one class (factory class) of a JAVA program. The edit processing section 410 creates various components by executing the factory class. In addition, processing by the edit processing section 410 is, in the case of the hardware configuration shown in FIG. 1, is processing executed under the control of the CPU 101.

In the process of setting animation, as was described with reference to FIG. 8, a process of associating image data to be read according to the state of a component is executed in the edit processing section 410. This process is executed as part of an editing process for the "property," "method," and "event" of a component.

In setting the look, that is, the graphics representation, of a GUI component to be generated, the operator inputs look & feel package specification data with respect to the edit processing section 410 that executes the factory class. In other words, the operator specifies either "Rich" or "Simple," and further, as described with reference to FIG. 8, sets image data to be read according to the state of a component.

In accordance with such setting information, a GUI application program having various components is generated, the generated GUI application program is stored in a program storage section 421, is execute data program execution section 422, and the generated GUI is displayed on a display section 423.

Figure 10:
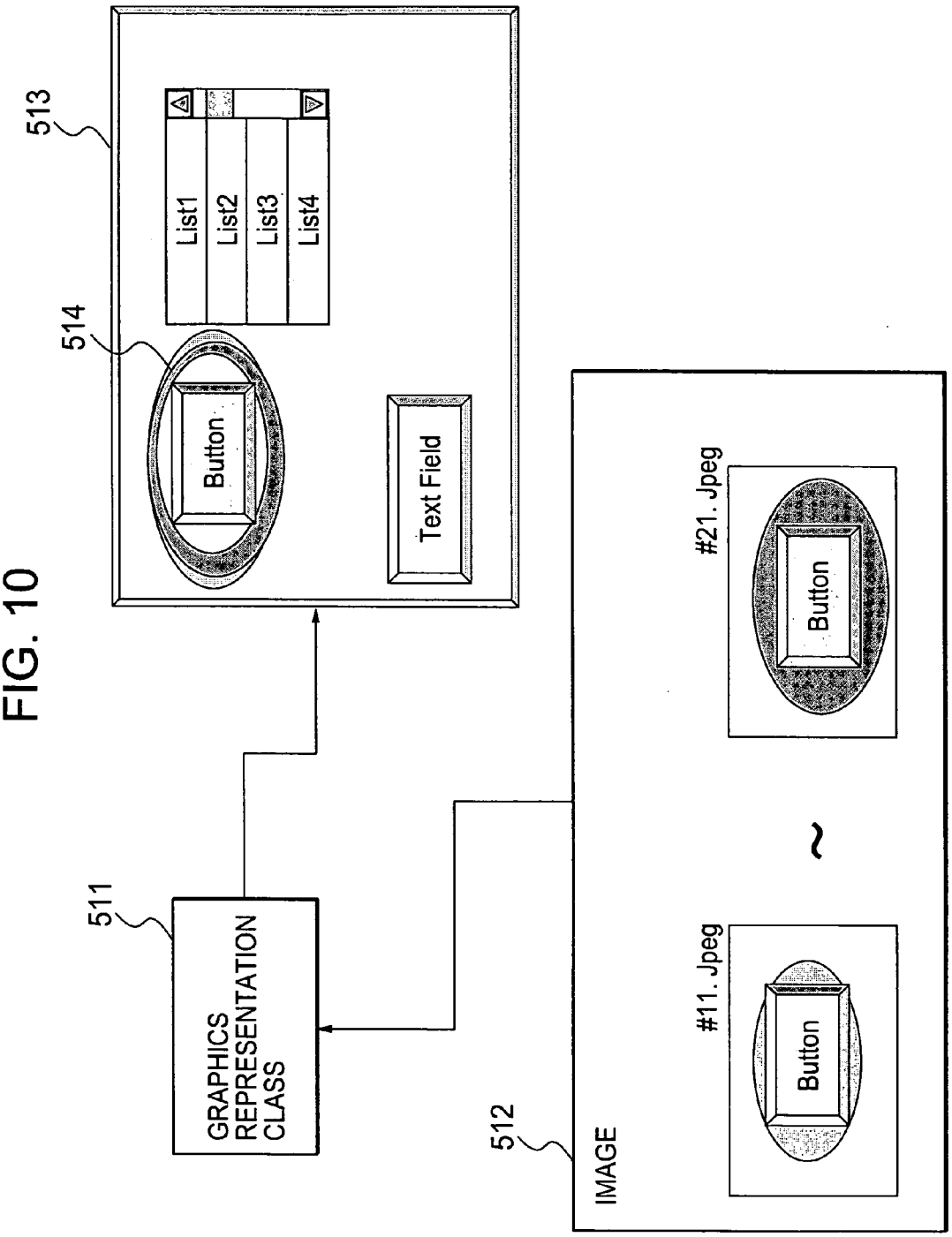
FIG. 10 is a diagram illustrating a process example of a process of executing animation corresponding to the state of a component generated with a GUI application development supporting apparatus of the present invention.

Next, the process at the time of animation execution, that is the process at a GUI display apparatus, will be described with reference to FIG. 10. A display process for animation 514 of a button as a GUI component shown on a display 513 will be described.

The animation display process is executed by a graphics representation class 511 of a graphics representation component included in the component of a button. In accordance with a program defined for the graphics representation class 511, an animation index method is called, the Jpeg images 11 through 21 set in the setting process described previously with reference to FIG. 8 are read from an image file [Image] 512, and the image of a button that is GUI displayed based on these plural images is displayed as the animation 514.

Here, an example is shown where an animation in which a ripple propagates around the button is displayed. The image file [Image] 512 can be stored by securing a partial region of the memory 102, the HDD 111 or some other storage means of the hardware configuration of FIG. 1 and setting it as an image file storage section.

In summarizing the processes described above as an animation display processing method sequence for a GUI component to be displayed on a display, it can be summarized as an execution step comprising:

(1) a class execution step of executing a graphics representation class of a graphics representation component that is associated with the component;

(2) an image reading step of reading pre-set image data from an image file in accordance with an animation index method called in the class execution step; and (3) a step of displaying on a display the image data read in the image reading step.

These processing steps are recorded as a program for executing a GUI application, and are executed in accordance with GUI operations by a user, in other words, animation display is carried out.

In addition, for the animation of components like buttons, various animations can be set easily by altering the called image data. For example, various animations may be set, such as generating concave- or convex-shaped distortions in a button, or changing the color as on and off operations of the button. In addition, it is also possible to adopt a configuration in which animation is continuously executed when in a focused state where a cursor is set thereon, and not just at the time of on and off operations. This is realized by calling an animation index method, and reading and executing a focus image file from image data with the overlapping of the cursor position over the button component position as a condition therefor.

In addition, as described with reference to FIG. 2, a plurality of graphics representation components storing different graphics representation process execution programs are prepared in the graphics representation component storage section even for the same component, a button for example, as in Simple, Rich or the like. In the example in FIG. 2, only the two kinds of Simple and Rich are shown, but, further, the setting of a plurality of graphics representation components, such as Rich 1, Rich 2, . . . and the like, is possible.

For each of these graphics representation components, it is possible to associate individual read image files that are each different. Even for a button that has the same function, the graphics representation component to be applied is determined by the initial look & feel package specification, and animation that is set in correspondence with that component is displayed. Thus, it becomes possible to carry out various different animation displays in accordance with the look & feel package specification.

As described above, in the configuration of the present invention, it becomes possible to freely set animation of each component that is set in a GUI, and settings of optimal component animation that corresponds to GUI-equipped device are easily carried out.

The present invention is provided with the configuration that allows to read and display pre-set image data from an image file in accordance with an animation index method that is carried out by a graphics representation class of a graphics representation component that is included in the component, and to set the read image in various combinations according to the state (on, off, focused and the like) of the component, it becomes possible to make users recognize that the visual effect of the state of the GUI component is more improved.

In the present invention, since a configuration is adopted in which the logical part and the graphics representation part of a component are configured separately, a GUI component is generated based on the logical part and the graphics representation part, and the graphics representation part is made to have an animation execution function based on image files according to the state of the component, it becomes possible to change with ease the setting mode of animation through a process that is independent of the logical part.

7. [GUI Display Apparatus Configuration Example]

Next, a configuration example of an apparatus, such as an information appliance, having a graphical user interface (GUI) that executes various display processes that are in line with the description above will be described with reference to FIG. 11.

As GUI-equipped devices, various household devices and communications devices come to mind. The apparatus configuration example shown in FIG. 11 shows one such example, and shows a GUI display apparatus configuration example that has a configuration in which a moving image can be played by receiving it via a network or by reading it from a storage medium.

Figure 11:
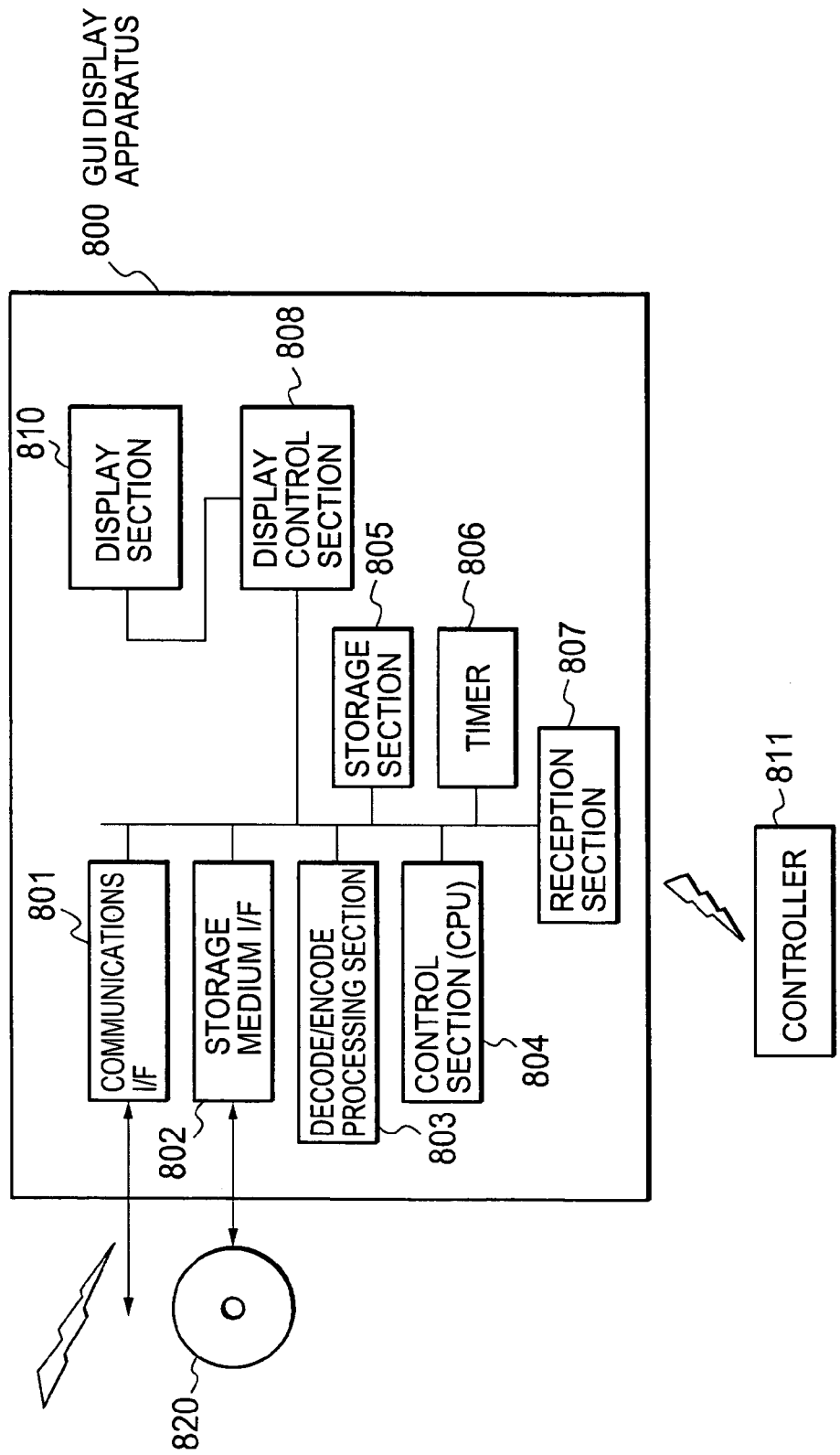
FIG. 11 is a block diagram showing an example of a configuration of a GUI display.

A GUI display apparatus 800 shown in FIG. 11 includes a communications interface 801 for receiving Internet-distributed data, broadcast data or the like, and receives HTML documents, movie contents and the like from data distribution sites. In addition, a storage medium interface 802 is a data transfer interface for such various storage media 820 as DVDs, flash memories and the like, and is an interface for inputting and outputting such various contents as moving image data and the like between the storage media 820 and the data processing apparatus 800.

When contents sent from an image distribution site or contents stored on the recording media 820 are encoded, they are displayed on a display apparatus 810 under the control of a display control section 808 after a decoding process is executed at a decode/encode processing section 803.

On the other hand, input data and various commands by users are inputted from a controller 811, received by a reception section 807, and out putted to a control section (CPU) 804. The control section 804 executes various processes in accordance with the previously described logical component that corresponds to each component, for example, executes an animation display process, by obtaining an image data according to the state of the component and by outputting the obtained image data.

The storage section in the GUI display apparatus 800 is a storage section that is used for the storage of received data, for the storage of various processing programs, for the storage of preset display image programs, as a storage area as a work area of the CPU 804 or the like, and is comprised of RAM, ROM and the like. A timer 806 is used for measuring the running time of the various programs in GUI processing.

The present invention has been described above in detail with reference to specific embodiments. However, it should be obvious that it is possible for those skilled in the art to make modifications and substitutions to these embodiments without departing from the scope of the present invention. In other words, the present invention has been disclosed in the form of examples, which are not to be considered restrictive. In determining the scope of the present invention, the claims should be taken into consideration.

In addition, the series of processes described in this specification can be executed through hardware, software, or a composite configuration of both. In executing the processes through software, a program in which the processing sequence is recorded may be installed to a memory within a computer that is incorporated into dedicated hardware and executed, or the program may be installed to a general-purpose computer that is capable of executing various processes and executed.

For example, the program may be recorded in advance on a hard disk or ROM (Read Only Memory) as recording media. Alternatively, the program may be temporarily or permanently stored (recorded) on removable recording media, such as flexible disks, CD-ROMs (Compact Disc Read Only Memory), MO (Magneto Optical) disks, DVDs (Digital Versatile Disc), magnetic disks, semiconductor memories and the like. Such removable recording media maybe provided as so-called packaged software.

In addition, besides being installed to a computer from such removable recording media described above, the program may be transferred wirelessly to a computer from a download site, or may be transferred by wire to a computer via such networks as a LAN (Local Area Network) and the Internet, and the computer may receive the program thus transferred, and install it to a recording medium such as a built-in hard disk or the like.

In addition, the various processes described in the specification may not only be executed chronologically as described, but also may be executed in a parallel manner or individually depending on the processing capability of the apparatus that executes the processes or as required. In addition, system as used in the present specification refers to a logical aggregate configuration of a plurality of apparatuses, and is not limited to one in which each constituent apparatus resides in the same body.

INDUSTRIAL APPLICABILITY

As described above, according to the present invention, it becomes possible to freely set an animation of each component that is set in a GUI, and settings of optimal component animation that corresponds to GUI-equipped devices are easily carried out. That is, since the present invention is provided with a configuration that allows to read and display pre-set image data from an image file in accordance with animation index methods that is carried out by a graphics representation class of a graphics representation component that is included in a component, it becomes possible to carry out an animation with an image that is set according to the state of the component and it becomes possible to carry out animation representation with visual effectiveness according to the state of the GUI component.

Further, according to the present invention, since a configuration is adopted in which the logical part and the graphics representation part of a component are configured separately, a GUI component is generated based on the logical part and the graphics representation part, and the graphics representation part is made to have an animation execution function based on image files according to the state of the component, it becomes possible to change with ease the setting mode of animation through a process that is independent of the logical part.

The invention claimed is:

1. A graphical user interface (GUI) application development supporting apparatus for supporting the development of a GUI application including components, the apparatus comprising:

a central processing unit;

a component storage section having a logical component storage section defining the processing functions of components, and a graphics representation component storage section separately defining graphical representation of components, the graphics representation component storage section containing a first executable program for performing simple graphics representation of components, and a second executable program for performing rich graphics representation of components;

an image storage section that stores a plurality of images, the plurality of images having images corresponding to a simple inactive state, images corresponding to a simple active state, images corresponding to a rich inactive state, and images corresponding to a rich active state; and an edit processing section that:

associates the images corresponding to the simple inactive state and the simple active state with the first executable program;

associates the images corresponding to the rich inactive state and the rich active state with the second executable program; and executes, based on a device executing the GUI application, the first executable program to generate a component based on a simple graphical representation or the second executable program to generate a component based on a rich graphical representation, the first or second executable program executing an animation index method, the animation index method extracting, from the stored plurality of images, images required by the animation index which are associated with the executed first or second program.

2. A graphical user interface (GUI) application development supporting method for supporting the development of a GUI application including components, the method comprising:

storing logical component data defining processing functions of components, and further storing, separately from the logical component data, a first executable program for performing simple graphics representation of components, and a second executable program for performing a rich graphics representation of components;

storing a plurality of images in an image storage section, the plurality of images having images corresponding to a simple inactive state, a simple active state, a rich inactive state, and a rich active state;

associating the images corresponding to the simple inactive state and the simple active state with the first executable program;

associating the images corresponding to the rich inactive state and the rich active state with the second executable program; and executing, based on a device executing the GUI application, the first executable program to generate a component based on a simple graphical representation or the second executable program to generate a component based on a rich graphical representation, the first or second executable program executing an animation index method, the animation index method extracting, from the stored plurality of images, images required by the animation index which are associated with the executed first or second program.

3. The method according to claim 2, further comprising:

storing logical components related to functions of the components in a logical component storage section;

selecting a logical component from the logical component storage section; and generating the component by combining the selected logical component and the selected graphics representation component.

4. A computer-readable storage medium storing a computer program that, when executed by a processor, performs a method for supporting the development of a GUI application including components, the method comprising:

storing logical component data defining processing functions of components, and further storing, separately from the logical component data, a first executable program for performing simple graphics representation of components, and a second executable program for performing a rich graphics representation of components;

storing a plurality of images in an image storage section, the plurality of images having images corresponding to a simple inactive state, a simple active state, a rich inactive state, and a rich active state;

associating the images corresponding to the simple inactive state and the simple active state with the first executable program;

associating the images corresponding to the rich inactive state and the rich active state with the second executable program; and executing, based on a device executing the GUI application, the first executable program to generate a component based on a simple graphical representation or the second executable program to generate a component based on a rich graphical representation, the first or second executable program executing an animation index method, the animation index method extracting, from the stored plurality of images, images required by the animation index which are associated with the executed first or second program.

5. The computer-readable storage medium according to claim 4, wherein the method further comprises:

storing logical components related to functions of the components in a logical component storage section;

selecting a logical component from the logical component storage section;

and generating the component by combining the selected logical component and the selected graphics representation component.

* * * * *